(12) United States Patent
Soendker

(10) Patent No.: US 12,202,630 B2
(45) Date of Patent: Jan. 21, 2025

(54) RECONFIGURABLE POWER PROCESSING UNIT FOR SPACECRAFT OPERATIONS

(71) Applicant: Aerojet Rocketdyne, Inc., Sacramento, CA (US)

(72) Inventor: Erich H. Soendker, Sacramento, CA (US)

(73) Assignee: Aerojet Rocketdyne, Inc., Sacramento, CA (US)

( * ) Notice: Subject to any disclaimer, the term of this patent is extended or adjusted under 35 U.S.C. 154(b) by 392 days.

(21) Appl. No.: 17/442,442

(22) PCT Filed: Jun. 3, 2019

(86) PCT No.: PCT/US2019/035138
§ 371 (c)(1),
(2) Date: Sep. 23, 2021

(87) PCT Pub. No.: WO2020/246951
PCT Pub. Date: Dec. 10, 2020

(65) Prior Publication Data

US 2022/0194634 A1    Jun. 23, 2022

(51) Int. Cl.
*B64G 1/42* (2006.01)
*B64G 1/40* (2006.01)
(Continued)

(52) U.S. Cl.
CPC .............. *B64G 1/428* (2013.01); *B64G 1/411* (2023.08); *F03H 1/0006* (2013.01); *F03H 1/0018* (2013.01); *H02J 7/0024* (2013.01)

(58) Field of Classification Search
CPC ....... B64G 1/428; F03H 1/0018; H02J 7/0024
See application file for complete search history.

(56) References Cited

U.S. PATENT DOCUMENTS

| 6,060,790 A | 5/2000 | Craig, Jr. |
| 6,350,944 B1 * | 2/2002 | Sherif ................... H01L 31/042 |
| | | 136/244 |

(Continued)

FOREIGN PATENT DOCUMENTS

| EP | 1227038 | 7/2002 |
| JP | S60178522 A | 9/1985 |

(Continued)

OTHER PUBLICATIONS

International Search Report and Written Opinion for International Patent Application No. PCT/US2019/035138 completed on Feb. 14, 2020.

(Continued)

*Primary Examiner* — Rina I Duda
(74) *Attorney, Agent, or Firm* — Fox Rothschild LLP; Carol E. Thorstad-Forsyth

(57) ABSTRACT

A reconfigurable power processing unit for a spacecraft including a plurality of power modules. Each of the power modules includes a first power source and a second power source. The first power source and the second power source are configured to be in series in a first state and in parallel in a second state. A plurality of contactors connect each power module to at least one of another power module in the plurality of power modules and a power processing output and are configured to control the state of the power modules.

18 Claims, 5 Drawing Sheets

(51) Int. Cl.
*F03H 1/00* (2006.01)
*H02J 7/00* (2006.01)

(56) References Cited

U.S. PATENT DOCUMENTS

| | | | | |
|---|---|---|---|---|
| 8,400,012 | B2* | 3/2013 | Weidenheimer | F41B 6/00 307/9.1 |
| 8,547,673 | B2* | 10/2013 | Natili | H02H 3/20 361/91.1 |
| 8,657,227 | B1* | 2/2014 | Bayliss | B64D 13/00 244/58 |
| 8,738,268 | B2* | 5/2014 | Karimi | H02J 3/38 700/286 |
| 9,641,112 | B2* | 5/2017 | Harknett | H02H 3/20 |
| 10,305,298 | B2 | 5/2019 | Kristensen | |
| 2016/0339858 | A1 | 11/2016 | Fink | |
| 2017/0074252 | A1* | 3/2017 | Madigan | B64G 1/405 |
| 2017/0133865 | A1* | 5/2017 | Chiueh | H02J 7/0016 |
| 2017/0217318 | A1* | 8/2017 | Kowalewski | B60L 58/20 |
| 2018/0127116 | A1* | 5/2018 | Rozman | B64G 1/443 |
| 2018/0219390 | A1* | 8/2018 | Tkachenko | H02J 7/0016 |
| 2019/0023144 | A1 | 1/2019 | Ge et al. | |

FOREIGN PATENT DOCUMENTS

| | | |
|---|---|---|
| JP | H08256404 A | 10/1996 |
| JP | H11234909 A | 8/1999 |
| JP | 2005168270 A | 6/2005 |
| JP | 2014239561 A | 12/2014 |
| JP | 2015216824 A | 12/2015 |
| JP | 2016217136 A | 12/2016 |
| JP | 2018078672 A | 5/2018 |

OTHER PUBLICATIONS

International Preliminary Report on Patentability for International Patent Application No. PCT/US2019/035138 completed on Dec. 7, 2021.
Notice of Reasons for Refusal, JP Application No. 2021-564244 dated Jan. 5, 2023.

* cited by examiner

RECONFIGURABLE POWER PROCESSING UNIT FOR SPACECRAFT OPERATIONS

CROSS-REFERENCE TO RELATED APPLICATION

This application claims priority to International Patent Application No. PCT/US2019/35138 filed on Jun. 3, 2019.

TECHNICAL FIELD

The present disclosure relates generally to spacecraft power processing units, and more specifically to a reconfigurable power processing unit for a spacecraft.

BACKGROUND

Spacecraft, such as satellites and other similarly sized space fairing devices, typically include thrusters configured to allow the spacecraft to reorient or maneuver. In addition to the thruster(s), the spacecraft will include one or more on-board systems that require electrical power to function. The power requirements of the thruster(s) and of the on-board systems are substantially distinct and existing spacecraft utilize distinct power processing units to provide power to the thrusters and to the on-board systems.

The power processing units required to power the thrusters are large and heavy, and are typically unused when the thrusters are not being operated. As a result, substantial amounts of space and weight on the spacecraft are utilized to facilitate limited operations and provide minimal utility outside of those limited operations.

SUMMARY OF THE INVENTION

In one exemplary embodiment a reconfigurable power processing unit for a spacecraft includes a plurality of power modules, each of the power modules including a first power source and a second power source, wherein the first power source and the second power source are configured to be in series in a first state and in parallel in a second state, and a plurality of contactors connecting each power module to at least one of another power module in the plurality of power modules and a power processing output and configured to control the state of the power modules.

In another example of the above described reconfigurable power processing unit for a spacecraft the plurality of contactors are configured to place a first module of the plurality of power modules in series with a second power module in the plurality of power modules in the first state.

In another example of any of the above described reconfigurable power processing units for a spacecraft the plurality of contactors are configured to place each first power source in parallel with each other first power source and each second power source in parallel with each other second power source in the second state.

In another example of any of the above described reconfigurable power processing units for a spacecraft a state of each contactor in the plurality of contactors is controlled via a controller.

In another example of any of the above described reconfigurable power processing units for a spacecraft the controller includes a memory storing instructions configured to transition the plurality of contactors from the first state to the second state by depowering the power processing unit, transitioning a state of each contactor in the plurality of contactors, and repowering the power processing unit.

In another example of any of the above described reconfigurable power processing units for a spacecraft each of the contactors in the plurality of contactors is one of a mechanical relay, a semiconductor switch, and an electronic logic circuit.

In another example of any of the above described reconfigurable power processing units for a spacecraft each of the contactors in the plurality of contactors is a mechanical relay.

In another example of any of the above described reconfigurable power processing units for a spacecraft the second state is a low voltage supply state, and wherein the plurality of contactors are configured to be normally in the first state.

In another example of any of the above described reconfigurable power processing units for a spacecraft the first power source in each power module in the plurality of power modules is a 150 volt 11 amp power source.

In another example of any of the above described reconfigurable power processing units for a spacecraft the second state is 600V, 22 A high voltage power supply.

In another example of any of the above described reconfigurable power processing units for a spacecraft the first state is 150V, 88 A low voltage power supply.

In another example of any of the above described reconfigurable power processing units for a spacecraft each power module in the plurality of power modules is identical.

In another example of any of the above described reconfigurable power processing units for a spacecraft the plurality of power modules includes at least four power modules.

In another example of any of the above described reconfigurable power processing units for a spacecraft the plurality of power modules includes exactly four power modules.

An exemplary method for operating a power processing unit includes providing high voltage power to a switched power bus for a duration dictated by a first load, powering down the power processing unit, transitioning the power processing unit from a first high voltage provision state to a second low voltage provision state by switching a state of each contactor in a plurality of contactors, powering up the power processing unit, and providing low voltage power to the switched power bus.

In another example of the above described method for operating a power processing unit the first load is an electric thruster, and the duration is a duration of thruster operations.

In another example of any of the above described methods for operating a power processing unit providing low voltage power to the switched power bus comprises providing low voltage power to at least one on board electric system of a spacecraft through the switched power bus.

In one exemplary embodiment a spacecraft power distribution system includes a power processing unit configured to provide high voltage power to a switched power bus in a first state and low voltage power to the switched power bus in a second state, at least one electronic thruster connected to the switched power bus and configured to receive power during the first state, at least one on-board electrical system connected to switched power bus and configured to receive power during the second state, and a controller configured to control the state of the power processing unit.

In another example of the above described spacecraft power distribution system the power processing unit includes a plurality of power modules, each of the power modules including a first power source and a second power source, wherein the first power source and the second power source are configured to be in series in a first state and in parallel in a second state, and a plurality of contactors connecting each power module to at least one of another power module in the plurality of power modules and a power processing output and configured to control the state of the power modules.

In another example of any of the above described spacecraft power distribution systems each power module in the plurality of power modules is identical.

These and other features of the present invention can be best understood from the following specification and drawings, the following of which is a brief description.

DETAILED DESCRIPTION

Figure 1:
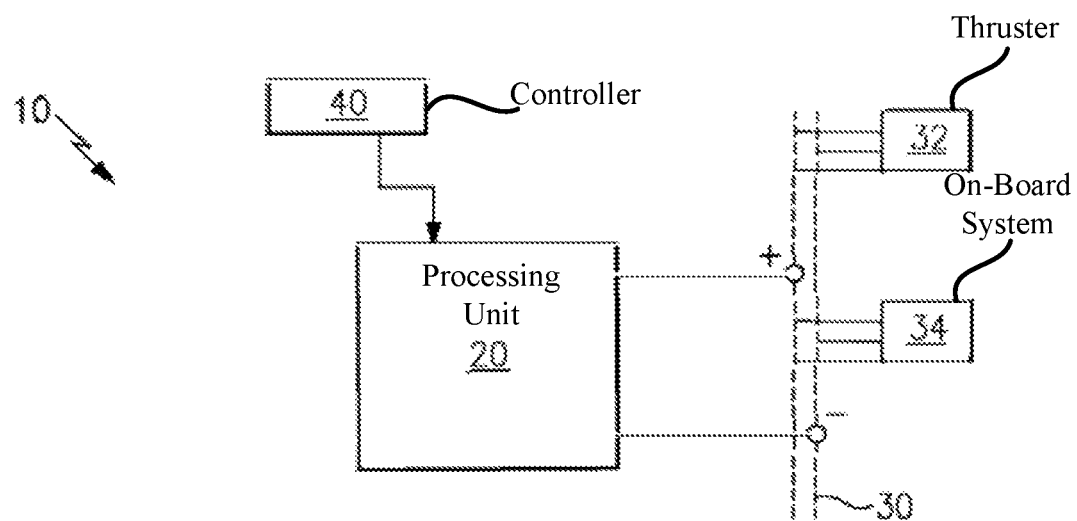
FIG. 1 illustrates a portion of a spacecraft power system including a reconfigurable power processing unit.

FIG. 1 schematically illustrates a direct current (DC) power system 10 for utilization in a spacecraft or other space fairing device. The power system 10 includes a reconfigurable power processing unit 20 configured to provide power to a switched power bus 30. Multiple distinct loads 32, 34 are connected to the switched power bus 30 including one or more electronic thrusters 32, and one or more electronic on-board systems 34. The state of the power processing unit 20 is controlled via a controller 40. While illustrated herein as a single control connection from the controller 40 to the power processing unit 20, it is appreciated that any number of corresponding connections can be utilized, as may be necessary to affect the reconfiguration described herein.

Figure 6:
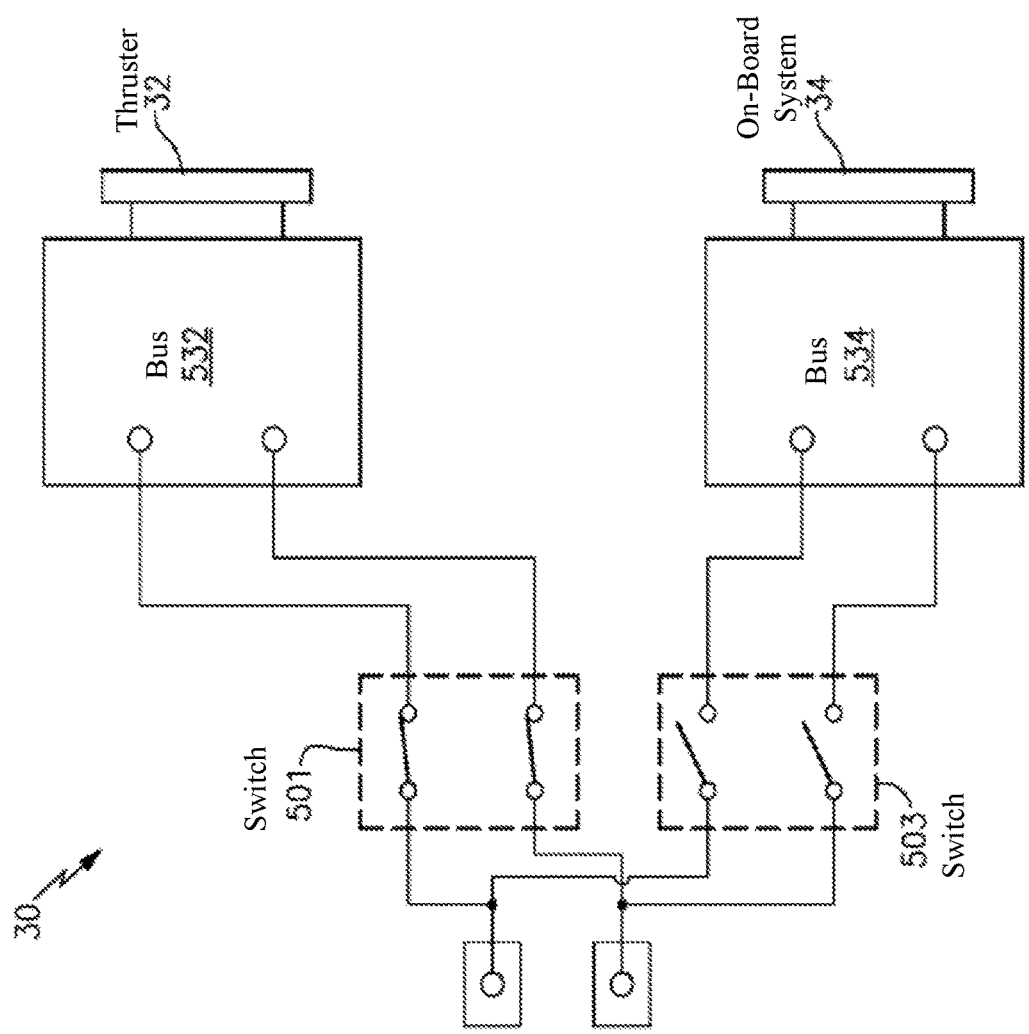
FIG. 6 illustrates a switched power bus according to one exemplary configuration.

The switched power bus 30 is a DC power transmission bus that is configured to switch which connected load 32, 34 is being provided power at any given time. The switched power bus 30 can be any known power bus type able to perform the power switching and withstand the voltage and current conditions of the high voltage load and of the low voltage load. Referring to FIG. 6, one embodiment of the switched power bus 30 can include switches 501, 503 configured to direct power to one of an electronic thruster bus 532 or to an on-board electronic systems bus 534. The electronic thruster bus 532, provides power to one or more electronic thrusters 32 and the on-board electrical system bus provides power to one or more on-board electrical systems 34.

The required power characteristics of each of the loads 32, 34 is distinct, with the thruster 32 requiring a high voltage, low current load (e.g. 600V at 22 A) and the on-board electronics 34 requiring a low voltage load (e.g. 75V-150V) and being able to withstand higher currents (e.g. 88 A).

In order to reduce weight, and decrease the area of the spacecraft required to fit the power processing unit(s) 20, the single reconfigurable power processing unit 20 is able to provide the high voltage, low current, power to operate the thruster 32 in one configuration and able to provide a low voltage, high current power to operate the onboard electronics system 34 in another configuration.

Figure 2:
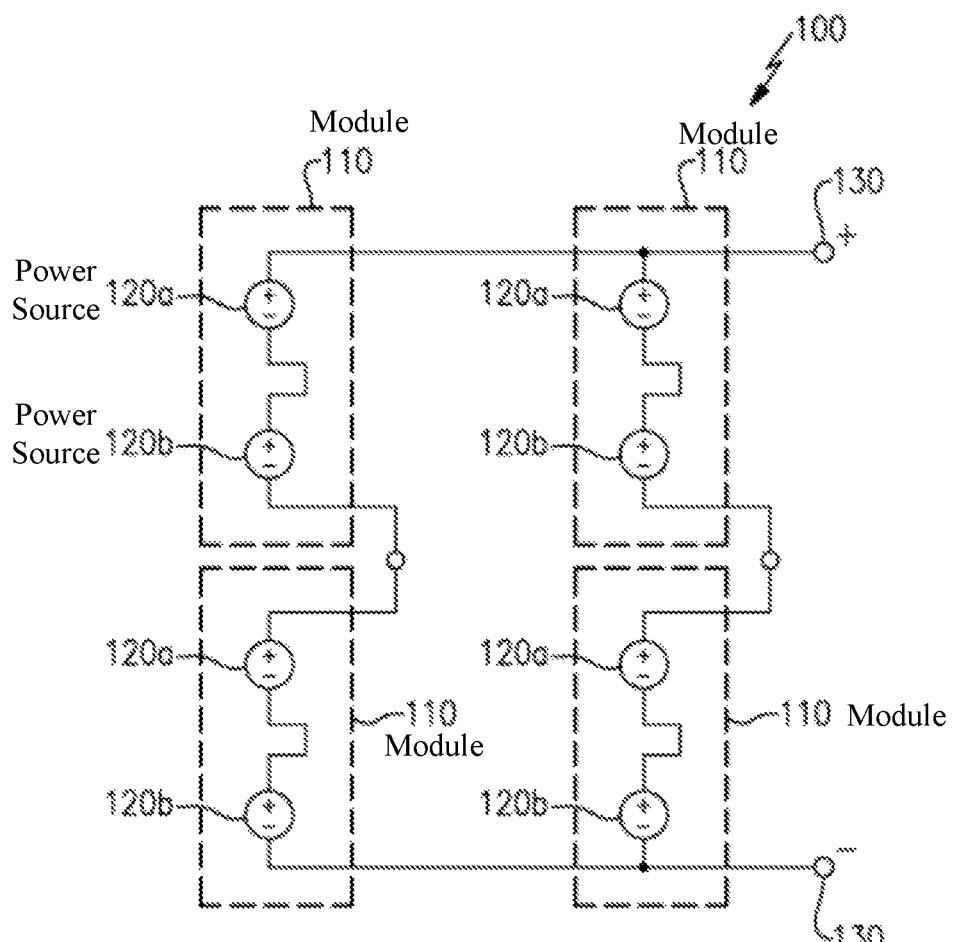
FIG. 2 schematically illustrates an exemplary reconfigurable power processing unit in a high voltage configuration.

With continued reference to FIG. 1, FIG. 2 schematically illustrates an exemplary reconfigurable power processing unit 100 in a high voltage, low current, power output configuration. Also with reference to FIG. 1, FIG. 3 schematically illustrates the same exemplary reconfigurable power processing unit 100 in a low voltage, high current, power output configuration.

The exemplary power processing unit 100 includes four modules 110, each of which includes a pair of power sources 120a, 120b. In one example, each of the power sources 120a, 120b is a 150V, 11 A power source. The exemplary modules are approximately identical. As used here, approximately identical refers to electrical circuits having the same or nearly the same characteristics accounting for layout variations and manufacturing tolerances.

In order to provide a 600V, 22 A power output to the switched bus 30, the power sources 120a, 120b in each module 110 are connected in series, such that a negative terminal of the first power source 120a is connected to a positive terminal of the second power source 120b. The modules 110 are grouped into two groups of two modules 110, and the modules 110 in a given group are placed in series as well. The groups are connected to the output terminals 130 in a parallel configuration. The 600V, 22 A power output configuration is illustrated in FIG. 2.

Figure 3:
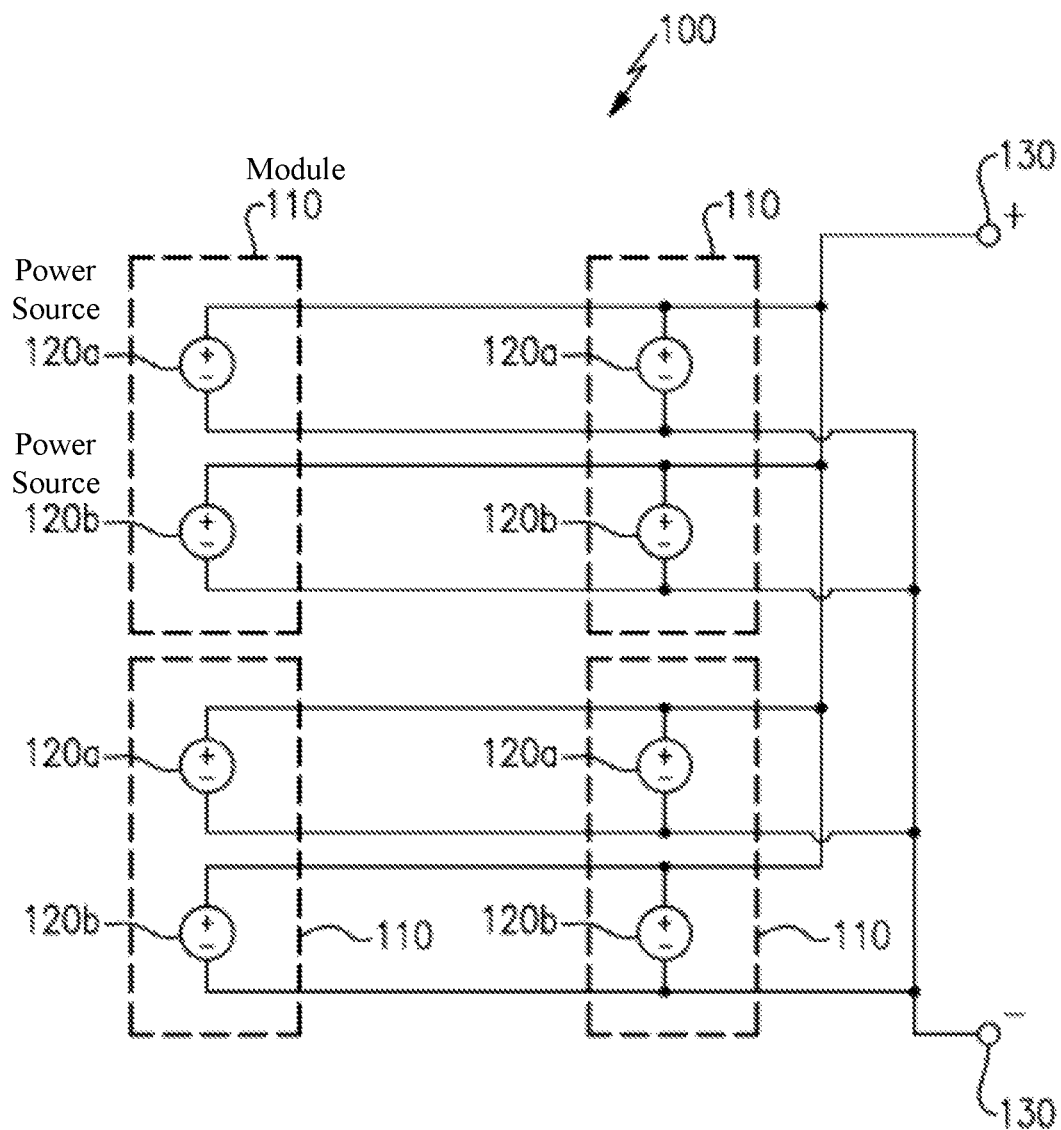
FIG. 3 schematically illustrates the exemplary reconfigurable power processing unit of FIG. 2 in a low voltage configuration.

When the thruster 32 is not required, the power processing unit 100 is switched to a second configuration, shown in FIG. 3. In one example, the second configuration is a 150V, 88 A power output configuration. To achieve this power output, the power sources 120a, 120b within each module 110 are switched to a parallel configuration with all of the power sources 120a, 120b being connected directly to the power outputs 130 in a parallel connection with each other power source 120a, 120b.

By being configured to operate in both of these configurations, the power processing unit 100 can provide the correct power levels to the thrusters 32, as well as to the onboard electrical systems 34, depending on the particular mode of operation of the spacecraft. This in turn allows the overall weight of the spacecraft to be reduced, as the single power processing unit 100 can provide the functions that previously required two distinct power processing units.

With continued reference to FIGS. 1-3, FIG. 4 schematically illustrates the power processing unit 100 including the switches 150 utilized to achieve the configurability. The power processing unit 100 is illustrated with the switches 150 in the high voltage output configuration of FIG. 2. In one example each of the switches 150 is a mechanical relay configured to switch from a first connection to either a second connection or an open connection when a command signal is received from the controller 40. In alternative examples, alternative switches 150 can be utilized including transistor networks or other electronic logic circuits. Each module 110 includes two switches 150 configured to switch the power sources 120a, 120b from series connection to a parallel connection. In addition, each of the modules 110 is connected to the outputs 130, and to the other module 110 in the corresponding group via a pair of switches 150 external to the modules 110.

In some examples, the switches 150 can a default, or normal, position that they are in when no control signal is received. By way of example, the default position can configure the power processing unit 100 as a low voltage supply (e.g. FIG. 3) while no control signal is received, and the switches 150 switch positions while a signal is received.

In alternative examples, the switches 150 can be latched contactors without a default position. In such an example, the switches 150 maintain their current state until a control signal is received, and switch states when the control signal is received. Once switched, the switches 150 maintain their new state until another control signal is received causing them to switch again.

Figure 4:
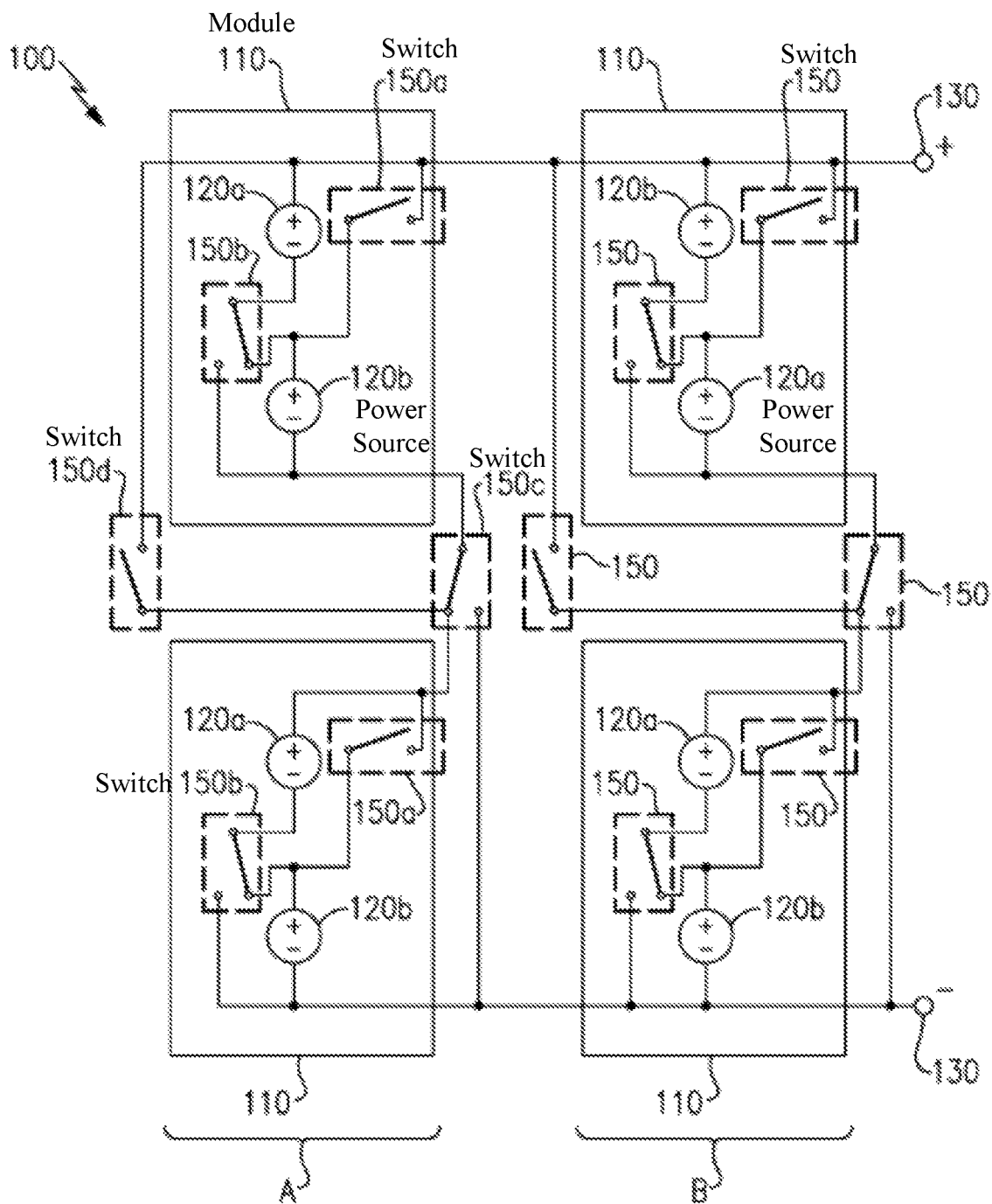
FIG. 4 schematically illustrates the exemplary reconfigurable power processing unit of FIGS. 2 and 3 including relay contactor configured to transition the configuration of the power processing unit.
Figure 5:
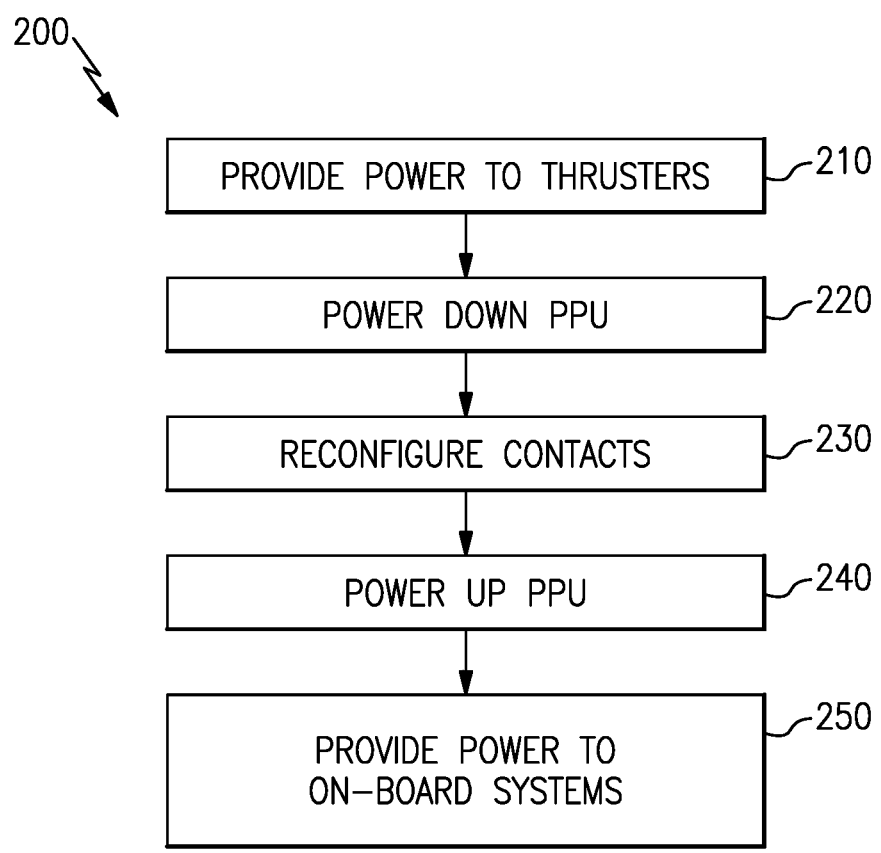
FIG. 5 illustrates a flow chart demonstrating the process for transitioning a power processing unit from a first configuration to a second configuration.

With reference to the general features of FIG. 4 described above, each grouping A, B of modules 110 is identical, and is structured in the following manner. The grouping A, B includes a first module 110 having a first power source 120a with a positive node and a negative node. The positive node of the first power source 120a is connected to either a positive node of the second power source 120b via a first contactor 150a and a positive output node 130+, or only to the positive output node 130+ dependent on the state of the first contactor 150a. the negative node of the first power source 120a is connected to either the positive node of the second power source 120b, or to a negative output node 130− of the power processing unit 100, depending on the state of a second contactor 150b internal to the module 110 and a state of a third contactor 150c.

Similarly, the second module 110 in each group A, B includes a first power source 120a with a positive and negative node. The positive node of the first power source 120a is connected to either the negative node of the second power source 120b of the first module in the group A, B via contactor 150c or is connected to the positive output terminal 130+ of the power processing unit 100 by another contactor 150 external to the modules 110 in the group A, B. The negative node of the first power supply 120a in the second module 110 is connected to either the negative output node 130− of the power processing unit 100, or to the negative output node 130− and the negative node of the second power supply 120b in the first module 110 of the group A, B, depending on the state of the contactor 150c.

With continued reference to FIGS. 1-4, FIG. 5 illustrates a process for transitioning from the high voltage configuration of FIG. 2 to the low voltage configuration of FIG. 3. Initially, the power processing unit 100 is in the configuration of FIG. 2 and provides power to the thrusters 32 in a "Provide Power to Thrusters" step 210. When the spacecraft is repositioned, or the thrusters 32 otherwise no longer need to be activated, the controller determines that power is no longer needed at the thrusters 32, and powers down the power processing unit 100 in a "Power Down PPU" step 220.

While the power processing unit 100 is powered down, the controller 100 causes the state of each of the switches 150 to transition to the opposite state in a "Reconfigure Contacts" Step 230. Once all of the switches 150 have been reconfigured, the controller 40 re-initiates the power processing unit 100 in a "Power Up PPU" Step 240, and provides power to the bus 30. The bus 30, in turn, provides power to the connected on board electrical systems 34 in a "Provide Power to On-Board Systems" step 250.

When power is again required at the thrusters 32, the process 200 is reversed to revert to the original contactor states. In either case, the contactors are reconfigured while the power processing unit 100 is in a powered down state in order to prevent any inadvertent configurations providing power to the bus 30.

While illustrated and described above as including exactly four modules 110, the reconfigurable system can be expanded by one of skill in the art to include additional pairs of power modules depending on the required power characteristics of a given system.

In the examples of FIGS. 1-6 the controller 40 is an adaptable digital controller including a control algorithm that facilitates unique control characteristics of each mode of operation. In alternative examples, the control scheme can be accomplished via a implementation of a complicated analog controller.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A reconfigurable power processing unit for a spacecraft comprising:
    a plurality of power modules, each power module of the plurality of power modules including a first direct current power source and a second direct current power source that are configured to be connected in series with each other in a first state and are configured to be connected in parallel with each other in a second state;
    a plurality of contactors connecting each power module to at least one of another power module in the plurality of power modules; and
    a controller configured to provide a control signal to each contactor of the plurality of contactors to control the state of the power modules;
    wherein, in the first state, first and second power modules of the plurality of power modules are arranged in series between first and second output lines of the reconfigurable power processing unit, and third and fourth power modules of the plurality of power modules are arranged in series between the first and second output lines;
    wherein, in the second state, the first and second direct current power sources of each said power module are (i) connected in parallel with each other and (ii) connected in parallel with the first and second direct current power sources of all other power modules across the first and second input lines;
    wherein the reconfigurable power processing unit provides direct current only at a first voltage level when the plurality of power modules are in the first state, and the reconfigurable power processing unit provides direct current only at a lower second voltage level when the plurality of power modules are in the second state; and
    wherein the controller is configured to transition the plurality of contactors from the first state to the second state by depowering the reconfigurable power processing unit, transitioning a state of each contactor of the plurality of contactors, and repowering the reconfigurable power processing unit.

2. The reconfigurable power processing unit of claim 1, wherein the plurality of contactors are configured to place a first module of the plurality of power modules in series with a second power module in the plurality of power modules in the first state.

3. The reconfigurable power processing unit of claim 1, wherein the plurality of contactors are configured to place each first direct current power source in parallel with each other first direct current power source and each second direct current power source in parallel with each other second direct current power source in the second state.

4. The reconfigurable power processing unit of claim 1, wherein each of the contactors in the plurality of contactors is one of a mechanical relay, a semiconductor switch, or an electronic logic circuit.

5. The reconfigurable power processing unit of claim 1, wherein each of the contactors in the plurality of contactors is a mechanical relay.

6. The reconfigurable power processing unit of claim 1, wherein the second state is a low voltage supply state.

7. The reconfigurable power processing unit of claim 1, wherein the first direct current power source in each power module in the plurality of power modules is a 150 volt 11 amp power source.

8. The reconfigurable power processing unit of claim 7, wherein the first state is 600V, 22 A high voltage power supply.

9. The reconfigurable power processing unit of claim 7, wherein the second state is 150V, 88 A low voltage power supply.

10. The reconfigurable power processing unit of claim 1, wherein each power module in the plurality of power modules is identical.

11. The reconfigurable power processing unit of claim 1, wherein the plurality of power modules includes at least four power modules.

12. The reconfigurable power processing unit of claim 11, wherein the plurality of power modules includes exactly four power modules.

13. A method for operating a power processing unit comprising:
   placing the power processing unit in a first state in which the power processing unit provides high voltage direct current to a switched power bus for a duration dictated by a first load;
   powering down the power processing unit;
   transitioning the power processing unit from the first state to a second state by switching a state of each contactor in a plurality of contactors, where the power processing unit provides low voltage direct current to the switched power bus when in the second state;
   powering up the power processing unit; and
   providing low voltage direct current to the switched power bus;
   wherein in the first state, first and second power modules of a plurality of power modules are arrange in series between first and second output lines of the power processing unit, and third and fourth power modules of the plurality of power modules are arranged in series between the first and second output lines; and
   wherein, in the second state, first and second direct current power sources of each said power module are (i) connected in parallel with each other and (ii) connected in parallel with first and second direct current power sources of all other power modules across the first and second input lines.

14. The method of claim 13, wherein the first load is an electric thruster, and the duration is a duration of thruster operations.

15. The method of claim 13, wherein providing low voltage power to the switched power bus comprises providing low voltage power to at least one on board electric system of a spacecraft through the switched power bus.

16. A spacecraft power distribution system comprising:
   a power processing unit configured to provide high voltage direct current power to a switched power bus in a first state and low voltage direct current power to the switched power bus in a second state;
   at least one electronic thruster connected to the switched power bus and configured to receive power during the first state;
   at least one on-board electrical system connected to the switched power bus and configured to receive power during the second state; and
   a controller configured to control the state of the power processing unit;
   wherein the power processing unit comprises a plurality of power modules, each power module of the plurality of power modules including a first direct current power source and a second direct current power source that are configured to be connected in series with each other in the first state and are configured to be connected in parallel with each other in the second state;
   wherein, in the first state, first and second power modules of the plurality of power modules are arranged in series between first and second output lines of the power processing unit, and third and fourth power modules of the plurality of power modules are arranged in series between the first and second output lines;
   wherein, in the second state, the first and second power sources of each said power module are (i) connected in parallel with each other and (ii) connected in parallel with the first and second power sources of all other power modules across the first and second input lines; and
   wherein the controller is configured to transition the power processing unit from the first state to the second state by depowering the power processing unit, transitioning the power processing unit from the first state to the second state, and repowering the power processing unit.

17. The spacecraft power distribution system of claim 16, wherein the power processing unit includes:
   a plurality of contactors connecting each power module to at least one of another power module in the plurality of power modules and a power processing output and configured to control the state of the power modules.

18. The spacecraft power distribution system of claim 17, wherein each power module in the plurality of power modules is identical.

* * * * *